United States Patent
Abdul Bari et al.

(10) Patent No.: US 12,420,911 B2
(45) Date of Patent: Sep. 23, 2025

(54) LOWER ATTACHMENT FOR TRIMMABLE HORIZONTAL STABILISER ACTUATOR

(71) Applicant: Goodrich Actuation Systems SAS, Saint-Marcel (FR)

(72) Inventors: Anh Vu Abdul Bari, Franconville (FR); Raphael Medina, Ecouen (FR)

(73) Assignee: GOODRICH ACTUATION SYSTEMS SAS, Saint-Marcel (FR)

( * ) Notice: Subject to any disclaimer, the term of this patent is extended or adjusted under 35 U.S.C. 154(b) by 0 days.

(21) Appl. No.: 18/530,566

(22) Filed: Dec. 6, 2023

(65) Prior Publication Data

US 2024/0190555 A1   Jun. 13, 2024

(30) Foreign Application Priority Data

Dec. 7, 2022   (EP) .................................... 22306810

(51) Int. Cl.
   *B64C 13/28* (2006.01)
   *F16H 25/20* (2006.01)

(52) U.S. Cl.
   CPC ........... *B64C 13/28* (2013.01); *F16H 25/205* (2013.01)

(58) Field of Classification Search
   CPC ... B64C 13/28; F16H 25/205; F16H 25/2006; F16H 25/2472
   See application file for complete search history.

(56) References Cited

U.S. PATENT DOCUMENTS

| | | | |
|---|---|---|---|
| 6,672,540 B1 * | 1/2004 | Shaheen | B64C 13/34 74/424.82 |
| 8,496,204 B1 | 7/2013 | Charafeddine et al. | |
| 10,155,582 B2 | 12/2018 | Medina et al. | |
| 10,337,593 B2 | 7/2019 | Medina et al. | |
| 10,787,279 B2 | 9/2020 | Moulon et al. | |
| 10,974,846 B2 | 4/2021 | Hale et al. | |
| 2018/0194454 A1 | 7/2018 | Olson et al. | |
| 2021/0062898 A1 | 3/2021 | Medina et al. | |

FOREIGN PATENT DOCUMENTS

| | | |
|---|---|---|
| DE | 102011120389 A1 | 6/2013 |
| EP | 1426290 B1 | 5/2007 |

OTHER PUBLICATIONS

European Search Report for Application No. 22306810.7, mailed May 12, 2023, 8 pages.

* cited by examiner

*Primary Examiner* — Terence Boes
(74) *Attorney, Agent, or Firm* — CANTOR COLBURN LLP

(57) ABSTRACT

There is provided a lower attachment for a trimmable horizontal stabiliser actuator (THSA) for connecting the THSA to a flight control surface. The attachment includes: a nut assembly for providing a load path through the THSA to the flight control surface when the THSA is connected to the flight control surface. The nut assembly includes a nut for location on a screw shaft of the THSA, a failsafe plate for coupling to the flight control surface, and a transfer plate for transferring load between the failsafe plate and the nut. The nut assembly has a first unloaded configuration in which there is no contact between the nut and the transfer plate, and a second loaded configuration in which there is contact between a first pair of opposed surfaces of the nut and the transfer plate.

14 Claims, 6 Drawing Sheets

LOWER ATTACHMENT FOR TRIMMABLE HORIZONTAL STABILISER ACTUATOR

CROSS REFERENCE TO RELATED APPLICATIONS

This application claims priority to European Patent Application No. 22306810.7 filed Dec. 7, 2022, the entire contents of which is incorporated herein by reference.

FIELD OF TECHNOLOGY

This disclosure relates to a lower attachment for a trimmable horizontal stabiliser actuator, and to a method of operating a lower attachment for a trimmable horizontal stabiliser actuator.

BACKGROUND OF THE INVENTION

It is well known for a flight actuator such as a trimmable horizontal stabiliser actuator (THSA) to include two mechanical load paths, one primary and the other secondary, with the latter intended to take up the load when the primary load path has failed. The flight actuator can therefore maintain control of a flight control surface to which the actuator is operably connected, even after failure of the primary load path.

In one example, a THSA is connected to a horizontal stabiliser of an aircraft by a lower attachment. The lower attachment comprises primary load path components which are normally loaded, allowing the load to be transmitted from the THSA to the horizontal stabiliser via the primary load path. In the event of failure of the primary load path (for example, a nut, gimbal and/or bearing of the primary load path may fail due to fatigue, manufacturing quality issues, or other problems), secondary load path components of the lower attachment which are normally unloaded will become loaded. Control of the horizontal stabiliser is thereby maintained with the load being transmitted via the secondary load path.

Typically, when the primary load path is functioning normally, the secondary load path is kept unloaded by maintaining space between some of the components of the secondary load path. In some cases, a clearance between parts of said components is present even after the secondary load path first becomes loaded. A consequence of the existence of this clearance is that there is play between the components. This can result in 'flutter' of the flight control surface, or backlash, which is undesirable.

The present disclosure aims to provide an improved lower attachment for a trimmable horizontal stabiliser actuator.

SUMMARY OF THE INVENTION

According to one aspect of the present disclosure there is provided a lower attachment for a trimmable horizontal stabiliser actuator (THSA) for connecting the THSA to a flight control surface, the lower attachment comprising: a nut assembly for providing a load path through the THSA to the flight control surface when the THSA is connected to the flight control surface, comprising: a nut for location on a screw shaft of the THSA, a failsafe plate for coupling to the flight control surface, and a transfer plate for transferring load between the failsafe plate and the nut; wherein the nut assembly has a first unloaded configuration in which there is no contact between the nut and the transfer plate, and a second loaded configuration in which there is contact between a first pair of opposed surfaces of the nut and the transfer plate, and a clearance between a second pair of opposed surfaces of the nut and the transfer plate; and a locking assembly operable to prevent relative movement of the nut and the transfer plate in response to the nut assembly transitioning to the second configuration.

Optionally, the locking assembly comprises a locking pin which is urged (e.g. biased) to extend into the clearance when the nut assembly transitions from the first configuration to the second configuration.

Optionally, the locking assembly comprises a biasing member arranged to bias the locking pin into the clearance.

A width of the locking pin may optionally be approximately the same as the height of the clearance.

Optionally, the lower attachment may comprise a fuse arranged to move in response to transition of the nut assembly from the first configuration to the second configuration. The fuse may thereby indicate that transition. The fuse may optionally be arranged so that movement of the nut assembly from the first configuration to the second configuration breaks the fuse.

Optionally, the nut comprises an opening. Optionally, when the nut assembly is in the first configuration, a head portion of the fuse is located in the opening and a neck portion of the fuse is located at an entrance to the opening.

The fuse may be fixed relative to the transfer plate in at least one direction.

The lower attachment optionally comprises a biasing member arranged to bias the fuse such that when the neck portion of the fuse breaks, a body of the fuse retracts away from the opening. The biasing member that is arranged to bias the locking pin may be provided in addition to the biasing member that is arranged to bias the fuse, or the same biasing member may perform both functions, or only one or neither of these biasing members may be provided.

Optionally, a rack and pinion mechanism is arranged such that when the body of the fuse retracts the locking assembly is actuated. For example, the rack and pinion mechanism may be arranged between the fuse and the locking pin such that when the body of the fuse retracts the locking pin is advanced into the clearance.

Optionally, the lower attachment comprises a sensor arranged to detect actuation of the locking assembly. For example, the sensor may be arranged to detect movement of the locking pin e.g. into the clearance.

Optionally, the nut assembly is a secondary nut assembly for providing a secondary load path of the THSA when the secondary nut assembly is in the second configuration. The lower attachment may comprise a primary nut assembly for providing a primary load path through the THSA to the flight control surface when the secondary nut assembly is in the first configuration.

An aspect of the present disclosure provides a trimmable horizontal stabiliser actuator comprising the lower attachment as described herein.

An aspect of the present disclosure provides a method of operating the lower attachment for a THSA as described herein, or a method of operating the trimmable horizontal stabiliser actuator as described herein, the method comprising: actuating the locking mechanism in response to the nut assembly transitioning to the second configuration to thereby prevent relative movement of the nut and the transfer plate. The method may be a method of reducing and/or preventing flutter.

Optionally, actuating the locking mechanism comprises inserting a locking pin into the clearance.

Optionally, the method comprises moving a body of a fuse in response to transition of the nut assembly from the first configuration to the second configuration. Movement of the body of the fuse may optionally cause the locking pin to move into the clearance.

Optionally, the method comprises checking whether or not the locking assembly is jammed. The checking may comprise applying a force to the fuse. The checking may comprise applying a force to the locking pin.

Optionally, the method is a method of operating the lower attachment having any of the features described above.

BRIEF DESCRIPTION OF THE DRAWINGS

Certain embodiments of the disclosure will now be described, by way of example only, and with reference to the accompanying drawings.

DETAILED DESCRIPTION OF THE INVENTION

Figure 1:
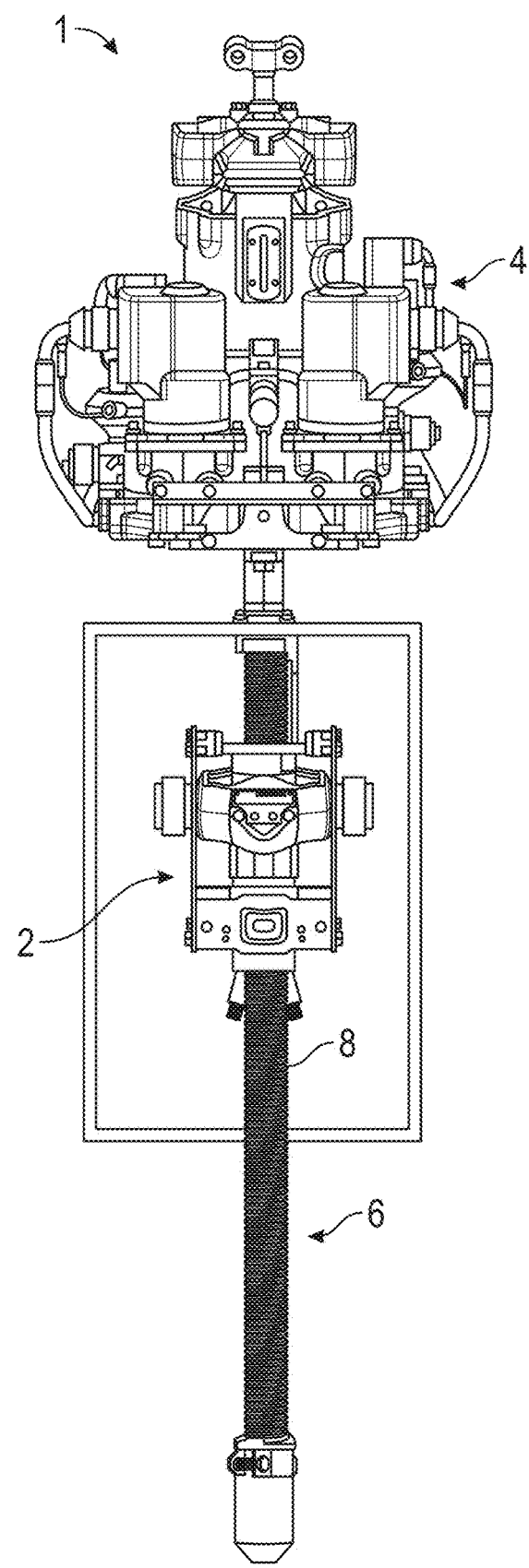
FIG. 1 shows a THSA with a lower attachment.

A flight actuator is used to control a flight control surface of an aircraft, typically to change an orientation of the flight control surface e.g. with respect to the fuselage of the aircraft. An example of a flight control surface is a horizonal stabiliser, which provides back lift and helps to trim the aircraft. The horizontal stabiliser is normally controlled by a trimmable horizontal stabilizer actuator (THSA).

Described herein is a lower attachment for a THSA which can be used to connect the THSA to a horizontal stabiliser and transfer load therebetween. The lower attachment will be described in the context of use with a THSA in the following description; however, the lower attachment could also be used to connect other types of actuators to other flight control surfaces.

The present invention provides a lower attachment for a THSA for connecting the THSA to a flight control surface, the lower attachment comprising: a nut assembly for providing a load path through the THSA to the flight control surface when the THSA is connected to the flight control surface, comprising: a nut for location on a screw shaft of the THSA, a failsafe plate for coupling to the flight control surface, and a transfer plate for transferring load between the failsafe plate and the nut; wherein the nut assembly has a first unloaded configuration in which there is no contact between the nut and the transfer plate, and a second loaded configuration in which there is contact between a first pair of opposed surfaces of the nut and the transfer plate, and a clearance between a second pair of opposed surfaces of the nut and the transfer plate; and a locking assembly operable to prevent relative movement of the nut and the transfer plate in response to the nut assembly transitioning to the second configuration.

Relative movement of the nut and transfer plate allows the second load path to remain unloaded until such time as the primary load path fails. Once the primary load path fails however, relative movement of the nut and the transfer plate may result in flutter e.g. of the flight control surface. By preventing relative movement of the nut and the transfer plate once the nut assembly has transitioned to the second configuration, the play (e.g. relative movement) between the two components is lessened or removed entirely and thus undesirable 'flutter' of the flight control surface can be reduced or eliminated. Furthermore, since the locking assembly is operable (i.e. arranged to actuate) in response to the nut assembly transitioning to the second configuration, the actuation is automatically triggered by the transition itself and does not require manual input e.g. from a pilot. Thus, flutter may automatically be reduced and/or eliminated.

The transfer plate may receive a trunnion of the nut. In the first unloaded configuration, there may be no contact between the trunnion and the transfer plate. In the second loaded configuration there may be contact between the trunnion and the transfer plate on a first side of the trunnion and a clearance between the trunnion and the transfer plate on a second side of the trunnion. One side of the trunnion may provide one of the first pair of opposed surfaces, and the other side of the trunnion may provide one of the second pair of opposed surfaces. The trunnion may therefore be disposed within a recess or aperture of the transfer plate, and may be moveable in opposite directions to bear against opposite sides of the transfer plate (and thereby transfer load into the transfer plate via the trunnion).

The locking assembly may comprise a locking pin which is urged (e.g. biased) to extend into the clearance when the nut assembly transitions from the first configuration to the second configuration. The locking pin may therefore bridge the clearance when the nut assembly is in the second configuration, and thereby prevent further relative movement between the nut and the transfer plate. Thus, flutter may be reduced. Relative movement between the trunnion and the transfer plate upon failure of the primary load path may create the clearance necessary to receive the locking pin. The trunnion and/or transfer plate may therefore move to allow the locking pin to enter into the clearance. Prior to movement of the transfer plate relative to the trunnion, there may be insufficient space to receive the locking pin. The locking pin may also not be urged to move until the primary load path fails (e.g. by shearing of a fuse as described herein).

A width of the locking pin is optionally approximately the same as the height of the clearance. Thus, the clearance may be completely bridged by the locking pin after actuation of the locking pin. The locking pin may therefore fill the clearance between the opposed surfaces of the nut (e.g. the trunnion of the nut) and the transfer plate, to prevent further movement therebetween. Although the disclosure herein refers to a locking pin, the locking pin may be a locking element of any suitable shape to fill the clearance between the nut and the transfer plate. When in the loaded configuration, a first surface of the locking pin may abut and/or oppose a first of the second pair of opposed surfaces, and a second surface of the locking pin on the other side to the first surface, may abut and/or oppose a second of the second pair of opposed surfaces. The locking pin may be disposed between the second pair of opposed surfaces once the nut assembly has transitioned to its second configuration.

The locking pin may comprise a tapered (e.g. wedge-shaped) head to more easily enter into the clearance between the second pair of opposed surfaces. The tapered head may help to correctly locate the locking pin within the clearance.

The locking assembly may comprise a housing. The housing may be fastened to the transfer plate or the nut. If present, the locking pin may be arranged to extend through one or more apertures in the housing. For example, a first end of the locking pin may be receivable in a first aperture in a proximal wall of the housing, the proximal wall facing and optionally abutting the transfer plate. The first aperture may be positioned to line up with the clearance when the nut assembly is in the second configuration, so that the locking pin can be advanced through the first aperture and into the clearance. A second end of the locking pin may extend through a second aperture in a distal wall of the housing, the distal wall opposing the proximal wall. The second end may protrude from the second aperture to allow an operator to observe and/or interact with the locking pin, e.g. as part of a checking operation as described herein.

The transition of the nut assembly from the first to the second configuration may involve a relative movement (e.g. axial movement) between the transfer plate and the nut. Used herein, the axial direction may refer to the direction of the axis of the screw shaft of the THSA when the lower attachment is positioned on the screw shaft. The clearance may therefore be an axial clearance, i.e. a gap between the second pair of opposed surfaces of the nut and the transfer plate in the axial direction. The locking assembly may be operable to prevent relative movement of the nut and the transfer plate in at least the axial direction.

The lower attachment may comprise a means for detecting whether the nut assembly has transitioned into the second configuration, to determine whether the load path (e.g. the second load path) provided by the nut assembly has become loaded. For example, an end of the locking pin projecting from the housing may move to thereby indicate that the locking pin has moved into the clearance, which in turn indicates that the second load path is loaded. The lower attachment may comprise a fuse, at least part of which is arranged to move in response to transition of the nut assembly from the first configuration to the second configuration. The fuse may thereby indicate that transition. The fuse may comprise another pin, for example.

The fuse may optionally be arranged so that movement of the nut assembly from the first configuration to the second configuration breaks the fuse e.g. shearing off a head portion of the fuse. Thus, a broken fuse may indicate that the nut assembly has transitioned into the second configuration.

The fuse may be arranged so that a head portion of the fuse is fixed (e.g. at least in respect of axial movement) relative to the nut and a body portion of the fuse is fixed (e.g. at least in respect of axial movement) relative to the transfer plate. Thus, when the nut assembly transitions from the first to the second configuration, the relative axial movement between the nut and the transfer plate may apply a shear force to the fuse causing it to break. The fuse may comprise a weakened neck portion which is a portion of the fuse configured to preferentially break at that location, e.g. a narrowed portion which has a smaller width than surrounding parts of the fuse. The fuse may be able to rotate about its axis and/or move laterally relative to the transfer plate and the nut.

In one specific example, the nut may comprise an opening for receiving a head portion of the fuse and the body portion of the fuse may be fixed relative to the transfer plate in the axial direction. In examples where the transfer plate receives a trunnion of the nut, the trunnion may comprise the opening. When the nut assembly is in the first configuration, the head portion of the fuse may be located in the opening and the weakened neck portion of the fuse may be located at an entrance to the opening. Thus, when the nut assembly transitions from the first to the second configuration, the relative movement of the nut and transfer plate may apply a shear force to the fuse at the neck portion at the entrance to the opening in the nut, causing the fuse to break. The broken fuse can thus indicate that the nut assembly has transitioned to the second configuration.

The fuse may be at least partially located inside the housing of the locking assembly. For example, the body of the fuse may be receivable in a third aperture in the proximal wall of the housing. The third aperture may be positioned to line up with the opening when the nut assembly is in the first configuration. A second end of the fuse may extend through a fourth aperture in the distal wall of the housing. The second end may protrude from the fourth aperture to allow an operator to observe and/or interact with the fuse, e.g. as part of a checking operation. The housing, nut and/or transfer plate may be arranged to hold the fuse stationary when the nut is in the first configuration. The head of the fuse may be larger than the third aperture, so that the fuse is moveable only in one direction until such time as it is broken. The shearing of the head from the body of the fuse may therefore enable the fuse body to move (at least partially) out of the housing via the fourth aperture.

The lower attachment optionally comprises a biasing member arranged to bias the fuse such that when the fuse breaks, the fuse retracts away from the opening. Thus, the position of the fuse can indicate whether or not the nut assembly transition has occurred based on whether the fuse has retracted. If the fuse is retracted, it is necessarily also broken, indicating that a shear force has been applied to it, and hence that the second load path is loaded. If the fuse is not retracted, then it is still being held in its first position by the fuse head disposed in the opening of the trunnion.

The fuse may also be arranged to "lock" the nut and the transfer plate in normal use, i.e. while the nut assembly is in the first configuration. For example, the fuse may provide some resistance to relative movement of the nut and the transfer plate while the nut assembly is in the first configuration, until a force threshold is reached at which point the fuse moves and/or breaks and the nut assembly transitions into the second configuration.

The fuse may be configured to actuate the locking assembly when the fuse moves and/or breaks in response to the nut assembly transitioning into the second configuration. The fuse may therefore be considered part of the locking assembly, or it may be considered a separate component of the lower attachment which interacts with the locking assembly, or it may be a separate component of the lower attachment which does not interact with the locking assembly (though it may still be located within the locking assembly housing).

For example, the lower attachment may be configured such that movement of the fuse causes actuation of the locking pin. In one example, a rack and pinion mechanism may be arranged such that when the fuse retracts (e.g. after the fuse head is sheared off) the locking pin is advanced into the clearance.

In some instances, a biasing member such as a spring may be arranged to bias the locking pin into the clearance. The biasing member may bias the locking pin directly, e.g. by contacting the locking pin, or it may be an indirect connection, such as via the fuse as described above. A spring may for example be located between an interior wall of the housing and a protrusion or flange of the locking pin to directly bias the locking pin. The biasing member may bias movement of the fuse body in its retracted direction via the locking pin e.g. via a rack and pinion.

The biasing member that is arranged to bias the locking pin may be provided in addition to the biasing member that is arranged to bias the fuse, or the same biasing member may perform both functions, or only one or neither of these biasing members may be provided. One or both biasing members may comprise springs, for example.

The fuse can advantageously provide multiple functions including indicating whether the nut assembly is in the first configuration, actuating the locking assembly, and/or resisting relative movement of the nut and the transfer plate while the nut assembly is in the first configuration and a force on the fuse is below a threshold.

The rack and pinion mechanism may be provided in addition to another locking pin biasing member (such as a spring directly biasing the locking pin). This provides redundancy in case of failure of one of the rack and pinion mechanism or the biasing member.

Actuation of the locking assembly is optionally irreversible without manual intervention. For example, in cases in which the locking pin is biased into the clearance, once the locking pin has been actuated it cannot be retracted without applying a force thereto to counter the biasing force. The locking assembly may therefore require a manual reset of the mechanism, with optional replacement of a broken fuse as well. Thus, the nut assembly cannot inadvertently revert to the first configuration.

The lower attachment may comprise a sensor arranged to detect actuation of the locking assembly e.g. actuation of the locking pin. The sensor may therefore detect that the locking assembly has successfully actuated and locked the nut assembly in the second configuration. Various types of sensors may be suitable for this purpose. For example, the locking pin comprises a notch and a sensor comprises a protrusion configured to rest in the notch when the locking assembly has not yet been actuated. When the locking pin moves into the clearance, the protrusion is pushed out of the notch which completes a circuit, thereby providing an electrical signal that the locking pin has moved. Other sensors such as optical sensors, magnetic sensors etc may be provided.

In some instances the nut assembly transitioning from the first to the second configuration may cause the second pair of opposed surfaces to come into contact and may create a second clearance between the first pair of opposed surfaces. Thus, a second locking pin may be provided, the second locking pin being urged to extend into the second clearance when the nut assembly transitions from the first configuration to the second configuration. The second locking pin may have a similar working principle to the first locking pin as described herein.

The housing of the locking assembly may be fastened to the transfer plate via at least one fastener, such as a screw, so as to be fixed relative thereto. The nut, e.g. the trunnion of the nut, may move relative to the housing, and therefore relative to the components within the housing such as the locking pin and the fuse.

The locking pin may be configured not to shear or break under normal conditions, e.g. unlike the fuse which is arranged to shear under predetermined conditions as part of the normal operation of the lower attachment. For example, the locking pin may comprise a material which is selected to withstand the average load of the THSA, and the locking pin may comprise no weakened portions at which the locking pin is designed to preferentially break. Thus, even when the locking assembly has been actuated and the locking pin experiences some load, the locking pin will remain intact and hence will remain functional in preventing relative movement of the nut and the transfer plate.

The locking pin may be shaped to correspond to the shape of the clearance. For example, the locking pin may have an outer contour which conforms to the contours of the second pair of opposed surfaces. A cross-section of the pin may for example comprise a regular polygon, or it may comprise arcuate faces for matching arcuate shapes of the second pair of opposed surfaces. Matching contours in this way allows the locking pin to sit snugly within the clearance and to maximise an area of the locking pin which is in contact with the nut and the transfer plate, to thereby maximise force transmission therebetween and reduce stresses on the locking pin.

Markings or indicia on the fuse and/or the locking pin could help display or indicate their condition, e.g. to an observer or a sensor. For example, the locking pin may comprise a marker at a predetermined location on the pin which is located so that it is only visible to an observer before actuation, and which is hidden to the observer (e.g. hidden inside the housing) once the locking pin has been actuated. Thus, visual observation of the marker shows that the locking pin has not yet been actuated. The marker may comprise any suitable indication such as a coloured band around the circumference of the pin. Similarly, the fuse may comprise a marker at a predetermined location on the fuse which is located so that it is hidden from the observer (e.g. within the housing) before the fuse is broken, and is only visible after the fuse has broken. For instance, the marker may be located on the part of the fuse body that protrudes from the fourth aperture once the fuse body has retracted. Thus, visual observation of the marker shows that the fuse has broken. Such markers may aid in a checking operation for verifying the condition of the nut assembly and/or the locking assembly.

The locking assembly may be positioned on an external surface of the transfer plate, e.g. on an opposing side to an inner side of the transfer plate which faces the nut. By positioning the housing on an external surface of the transfer place, this provides easy access to the locking mechanism by an operator, e.g. for installing the locking mechanism and/or for checking the operation of the mechanism. The locking assembly could alternatively be provided on the inner side of the transfer plate.

The nut assembly of the lower attachment described above may be a secondary nut assembly for providing a secondary load path through the THSA when the secondary nut assembly is in the second configuration. The lower attachment may additionally comprise a primary nut assembly for providing a primary load path through the THSA to the flight control surface when the secondary nut assembly is in the first configuration.

The lower attachment may be operated by actuating the locking mechanism in response to the nut assembly transitioning to the second configuration to thereby prevent relative movement of the nut and the transfer plate. The locking mechanism may fill the clearance between the nut and transfer plate.

Actuating the locking mechanism may comprise inserting a locking pin into the clearance. The fuse may move in response to transition of the nut assembly from the first configuration to the second configuration. Movement of the fuse optionally causes the locking pin to move into the clearance.

When the nut assembly is in the first configuration, the fuse may be actuated (e.g. pushed inwards), for example by hand or by a dedicated tool. A similar test may be applied to the locking mechanism, e.g. by pulling the locking pin outwards by a hand or a tool, to check if it moves as needed to perform its function. These steps can be performed as part of a checking operation to check whether or not the nut assembly has transitioned, whether or not the locking assembly has been actuated, and/or whether or not the locking assembly is jammed.

FIG. 1 shows a THSA 1 including a lower attachment 2 (within the indicated box) for connecting the THSA 1 to a flight control surface. The THSA 1 comprises an actuation assembly 4 arranged to drive a screw 6. The lower attachment 2 is located on a screw shaft 8 of the screw 6 and is connected to a flight control surface (not shown). The actuation assembly 4 controls the flight control surface by applying a load which is transferred via the screw 6 and the lower attachment 2.

Figure 2:
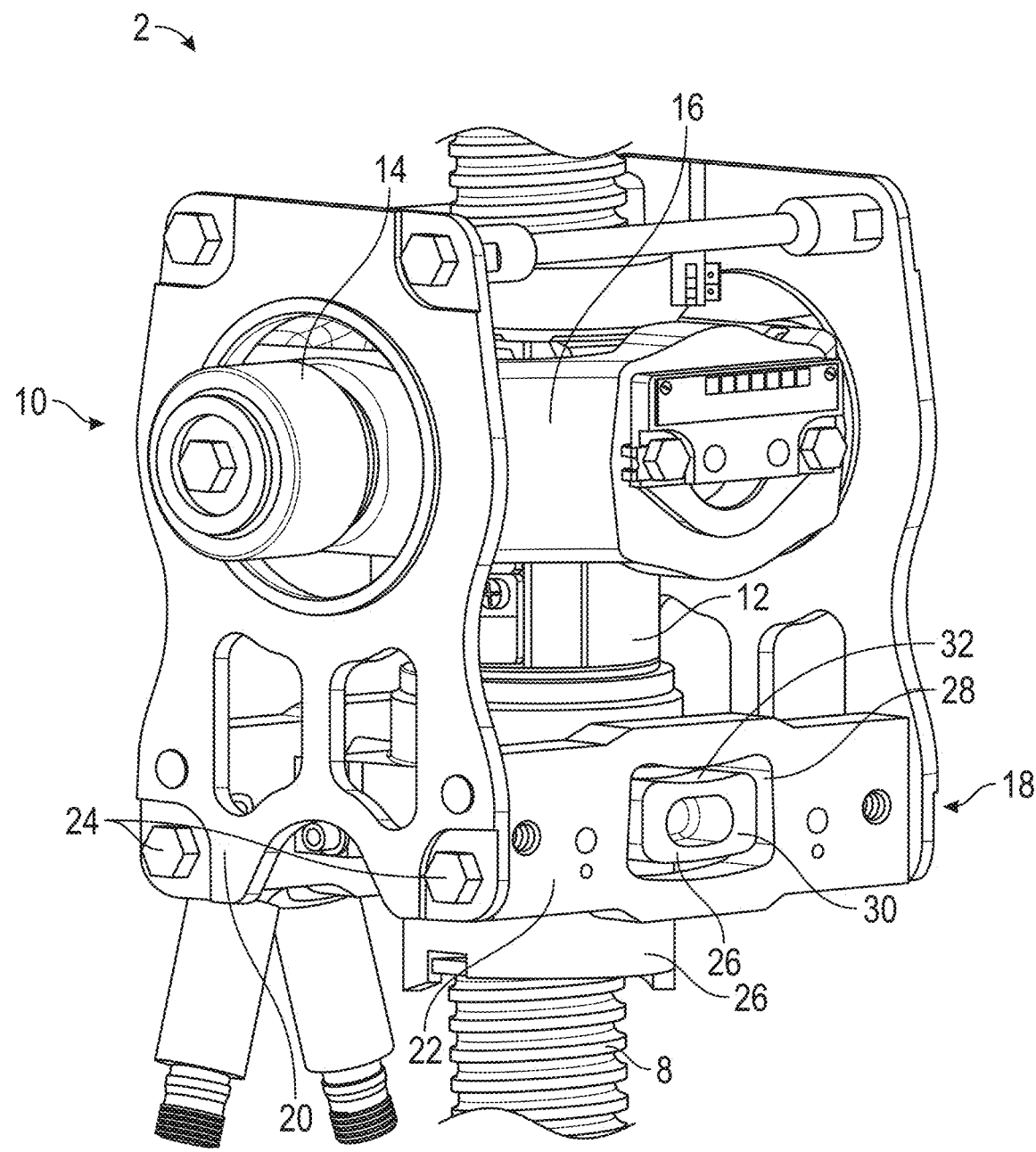
FIG. 2 shows an enlarged perspective view of the lower attachment of the THSA of FIG. 1.

FIG. 2 shows an enlarged perspective view of the lower attachment 2 of FIG. 1 arranged on the screw shaft 8. The lower attachment 2 comprises a primary nut assembly 10 comprising a primary nut 12 arranged on the screw shaft 8 and connected to bushings 14 by a gimbal mechanism 16. The gimbal mechanism 16 locks the primary nut 12 in rotation so that the nut 12 translates axially along the screw shaft 8 when the screw 6 is rotated by the actuation assembly 4 shown in FIG. 1. The bushings 14 are connected to the flight control surface (not shown). A primary load path of the lower attachment 2 is thus defined by the primary nut 12, gimbal mechanism 16 and bushings 14.

The lower attachment 2 also provides a secondary load path which is normally unloaded and which becomes loaded upon failure of the primary load path.

The lower attachment 2 comprises a secondary nut assembly 18 for providing the secondary load path. The secondary nut assembly 18 comprises a failsafe plate 20 for connection to the flight control surface, a transfer plate 22 connected to the failsafe plate 20 via fasteners 24, and a secondary nut 26 located on the screw shaft 8. The transfer plate 22 couples the secondary nut 26 to the failsafe plate 20.

In this example, the transfer plate 22 comprises an aperture 28 that receives a trunnion 30 of the secondary nut 26. In other examples, the secondary nut 26 may receive a protrusion of the transfer plate, and/or the trunnion 30 may be received in a recess (rather than an aperture 28) of the transfer plate 22. Other suitable arrangements could also be provided.

In FIG. 2, the lower attachment 2 is in a first configuration in which the secondary load path is unloaded. Thus, there is no contact between the trunnion 30 and the transfer plate 22. In other words, there is a space or gap 32 between the trunnion 30 and the transfer plate 22 on all outer surfaces of the trunnion 30. When the secondary load path becomes loaded, there is a relative axial movement (e.g. in the direction of the length of the screw shaft 8) between the transfer plate 22 and the trunnion 30 which brings the two components 22, 30 into contact. This is shown in more detail in FIGS. 3 and 4.

Figure 3:
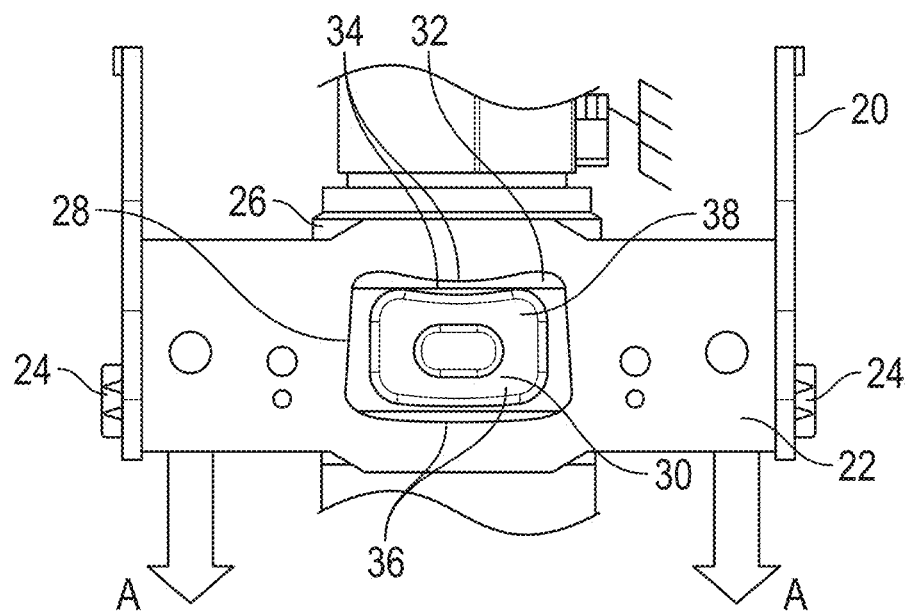
FIG. 3 shows a partial front view of a nut assembly of the lower attachment of FIG. 2 in a first unloaded configuration.

As shown in FIG. 3, when the lower attachment 2 is in the first configuration in which the secondary nut assembly 18 is unloaded, there is a gap 32 between the trunnion 30 and the transfer plate 22 such that there is no contact therebetween. Thus, there is no contact between a first pair of opposed surfaces 34 of the nut 26 and the transfer plate 22, and there is no contact between a second pair of opposed surfaces 36 of the nut 26 and the transfer plate 22. As the secondary nut assembly 18 transitions into the second configuration, there is a relative axial movement between the trunnion 30 and the transfer plate 22 (shown by arrows A).

Figure 4:
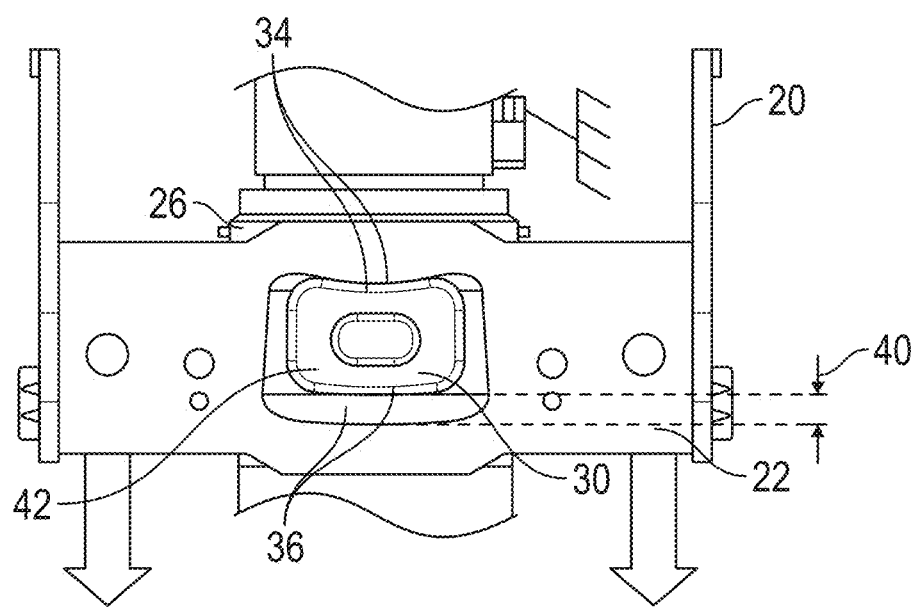
FIG. 4 shows a partial front view of the nut assembly of the lower attachment of FIG. 2 in a second loaded configuration.

FIG. 4 shows the resulting second loaded configuration of the secondary nut assembly 18 after this relative movement. In the second loaded configuration there is contact between the trunnion 30 and the transfer plate 22 on a first side 38 of the trunnion 30 and a clearance 40 between the trunnion 30 and the transfer plate 22 on a second side 42 of the trunnion 30. Specifically, there is contact between the first pair of opposed surfaces 34 of the nut 26 and the transfer plate 22, and there is no contact between the second pair of opposed surfaces 36 of the nut 26 and the transfer plate 22. Thus, load can be transferred between the secondary nut 26 and the transfer plate 22 via the first pair of opposed surfaces 34 which are now in contact.

On the second side 42 of the trunnion 30, the relative movement enlarges the pre-existing gap 32 between the trunnion 30 and the transfer plate 22, resulting in the clearance 40. This clearance 40 allows play (e.g. relative movement) between the transfer plate 22 and the trunnion 30, which can result in 'flutter' of the flight control surface or backlash.

Figure 5:
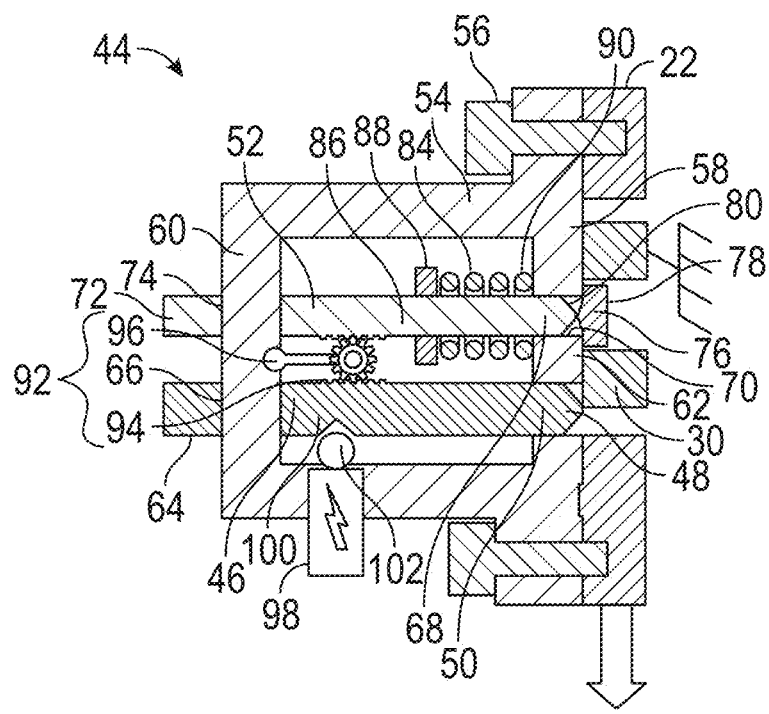
FIG. 5 shows a side cross-sectional view of a locking assembly operable to lock the nut assembly of FIGS. 3 and 4, the nut assembly being in the first unloaded configuration.
Figure 6:
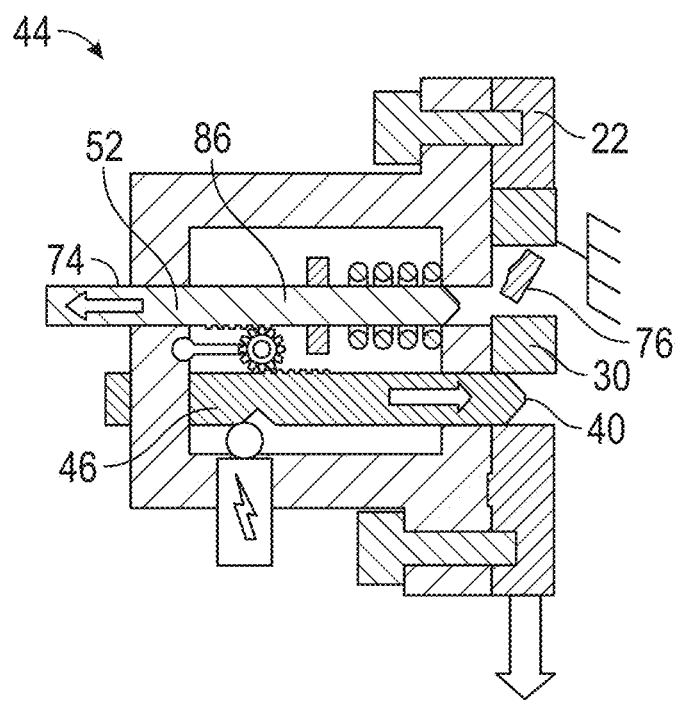
FIG. 6 shows a side cross-sectional view of the locking assembly of FIG. 5, the nut assembly being locked in the second loaded configuration by the locking assembly.

As shown in FIGS. 5 and 6, the lower attachment 2 of the present invention is provided with a locking assembly 44 operable to prevent relative movement of the secondary nut 26 and the transfer plate 22 in response to the secondary nut assembly 26 transitioning to the second configuration.

The locking assembly 44 comprises a locking pin 46 which is biased to extend into the clearance 40 when the secondary nut assembly 18 transitions from the first configuration (FIG. 5) to the second configuration (FIG. 6). The locking pin 46 bridges the clearance 40 when the secondary nut assembly 18 is in the second configuration, and thereby reduces or prevents further relative movement between the trunnion 30 of the secondary nut 26 and the transfer plate 22. Thus, flutter and backlash is reduced.

The locking pin 46 has a tapered head 48 at a first end 50 thereof. The tapered head 48 allows the locking pin 46 to more easily enter into the clearance 40 between the second pair of opposed surfaces 36 and helps to correctly locate the locking pin 46 within the clearance 40.

A width of the locking pin 46 is advantageously approximately the same as the height of the clearance 40. This means that when the locking pin 46 is inserted into the clearance 40, the clearance 40 is fully bridged so that there is no play between the trunnion 30 and the transfer plate 22. The locking pin 46 therefore contacts both of the second pair of opposed faces 36 when the secondary nut assembly 18 is in the second configuration and the locking assembly 44 has been actuated.

In FIGS. 5 and 6, the lower attachment 2 comprises a fuse 52. The fuse 52 and the locking pin 46 are provided within a housing 54 which is fastened to the transfer plate 22 via fasteners 56. The fuse 52 and the locking pin 46 extend between opposing axially-extending sides 58, 60 of the housing 54 and protrude from apertures located in said opposing sides 58, 60. Specifically, the first end 50 of the locking pin 46 is receivable in a first aperture 62 in a proximal wall 58 of the housing 54, the proximal wall 58 facing and abutting the transfer plate 22. A second end 64 of the locking pin 46 extends through and protrudes from a second aperture 66 in a distal wall 60 of the housing 54, the distal wall 60 opposing the proximal wall 58. A first end 68 of the fuse 52 extends through a third aperture 70 in the proximal wall 58 of the housing 54. A second end 72 of the fuse 52 extends through and protrudes from a fourth aperture 74 in the distal wall 60 of the housing 54.

While the secondary nut assembly 18 is in the first configuration (while the fuse 52 is intact), the fuse 52 comprises a head portion 76 at the first end thereof which is located outside of the housing 54 and in an opening 78 of the trunnion 30. The head portion 76 has a width wider than the third aperture 70 of the housing 54 through which the fuse 52 extends. This prevents the fuse 52 from retracting into the housing 54 while the fuse 52 is intact. The fuse 52 can advantageously be used as an indication of whether the secondary nut assembly 18 is in the first configuration, e.g. by observing the length of fuse which extends out of the fourth aperture 74 visually or using a sensor.

The fuse comprises a weakened neck portion 80 located at an entrance to the opening 78. In this example, the neck portion 80 is provided as a narrowing of the fuse width.

A biasing member 84, in this case a spring 84, is arranged to bias the fuse 52 such that when the neck portion 80 of the fuse 52 breaks, a body 86 of the fuse 52 will retract away from the opening 78. The spring 84 extends between and abuts a protrusion 88 of the fuse 52 and an interior wall 90 of the housing 54 located proximate the trunnion 30, thereby applying a force to bias the fuse 52 away from the interior wall 90.

A rack and pinion mechanism 92 is located between and engaged with the fuse 52 and the locking pin 46. In this example, each of the fuse 52 and the locking pin 46 comprise a rack 94, and a pinion 96 is connected to the housing 54, the pinion 96 engaging both of the racks 94 to thereby link the movement of the fuse 52 and the movement of the locking pin 46. When the fuse 52 is sheared, the rack and pinion 92 move the locking pin 46, so the locking pin 46 is only urged in to the clearance 40 when the clearance 40 has been created. The locking pin 46 is therefore only urged into the clearance upon failure of the primary load path and the fuse 52, and therefore does not risk impinging unnecessarily on e.g. the trunnion 30.

The lower attachment 2 comprises a sensor 98 arranged to detect movement of the locking pin 46. The locking pin 46 comprises a notch 100 and the sensor 98 comprises a switch comprising a protrusion 102 configured to rest in the notch 100 when the locking assembly 44 is in its normal, unactuated position. The switch is normally off. When the locking pin 46 moves into the clearance 40 or moves out of the second aperture 66 as part of a checking operation (described later), the protrusion 102 is pushed out of the notch 100 and completes a circuit. Thus, an electrical signal indicating that the locking pin 46 has moved is generated. The sensor 98 may also be provided on the fuse 52. Any suitable location of the sensor can of course be used.

Operation of the locking assembly 44 proceeds as follows. When the secondary nut assembly 18 transitions from the first configuration to the second configuration, the transfer plate 22 moves axially relative to the trunnion 30. The fuse 52, which is fixed relative to the transfer plate 22 in the axial direction via the housing 54, will shear at the weakened neck portion 80. This causes the head portion 76 to break away from the rest of the fuse 52. As a result, the fuse body 86 is no longer prevented from retracting from the opening 78 by the widened head portion 76. The biasing member 84 therefore causes the fuse 52 to retract into the housing 54. As the fuse body 86 retracts, movement of the rack 94 of the fuse 52 causes the pinion 96 to rotate, which thereby pushes the rack 94 of the locking pin 46 causing the locking pin 46 to move in an opposing direction to the fuse body 86. At the same time, the clearance 40 widens due to the axial movement of the transfer plate 22 relative to the trunnion 30. When the height of the clearance 40 is the same as the width of the locking pin 46, the first end 50 of the locking pin 46 moves into the clearance 40. The movement of the locking pin 46 may be helped by the tapered head 48.

FIG. 6 shows the resulting configuration of the secondary nut assembly 18 and the locking assembly 44. The head portion 76 of the fuse 52 has broken away and the fuse body 86 has retracted. The locking pin 46 has moved into the clearance 40 in response to the transition. The locking assembly 44 thereby locks the trunnion 30 and the transfer plate 22 together, preventing any further relative movement therebetween in at least the axial direction. Flutter and backlash is thereby reduced and/or eliminated.

Additionally, an operator can visually observe that the fuse 52 is protruding further out of the fourth aperture 74, providing an indication that the fuse 52 has broken and the secondary nut assembly 18 has transitioned into the second configuration. The operator may also observe that the locking pin 46 protrudes less far, again indicating that the locking pin 46 has been actuated into the clearance 40. These observations could also be made automatically using a sensor. Markings on the fuse 52 and/or the locking pin 46 could help display their condition. For example, the locking pin 46 may comprise a marker (e.g. a physical indication at a predetermined location on the pin 446) which is located so that it is only visible to an observer before actuation, and which is hidden to the observer (e.g. inside the housing 54) once the locking pin 46 has been actuated. Thus, visual observation of the marker shows that the locking pin 46 has not yet been actuated. Similarly, the fuse 52 may comprise a marker which is located so that it is hidden from the observer (e.g. within the housing 54) before the fuse 52 is broken, and is only visible after the fuse 52 has broken. For instance, the marker may be located on the part of the fuse body 86 that protrudes from the fourth aperture 74 once the fuse body 86 has retracted. Thus, visual observation of the marker shows that the fuse 52 has broken.

Figure 7:
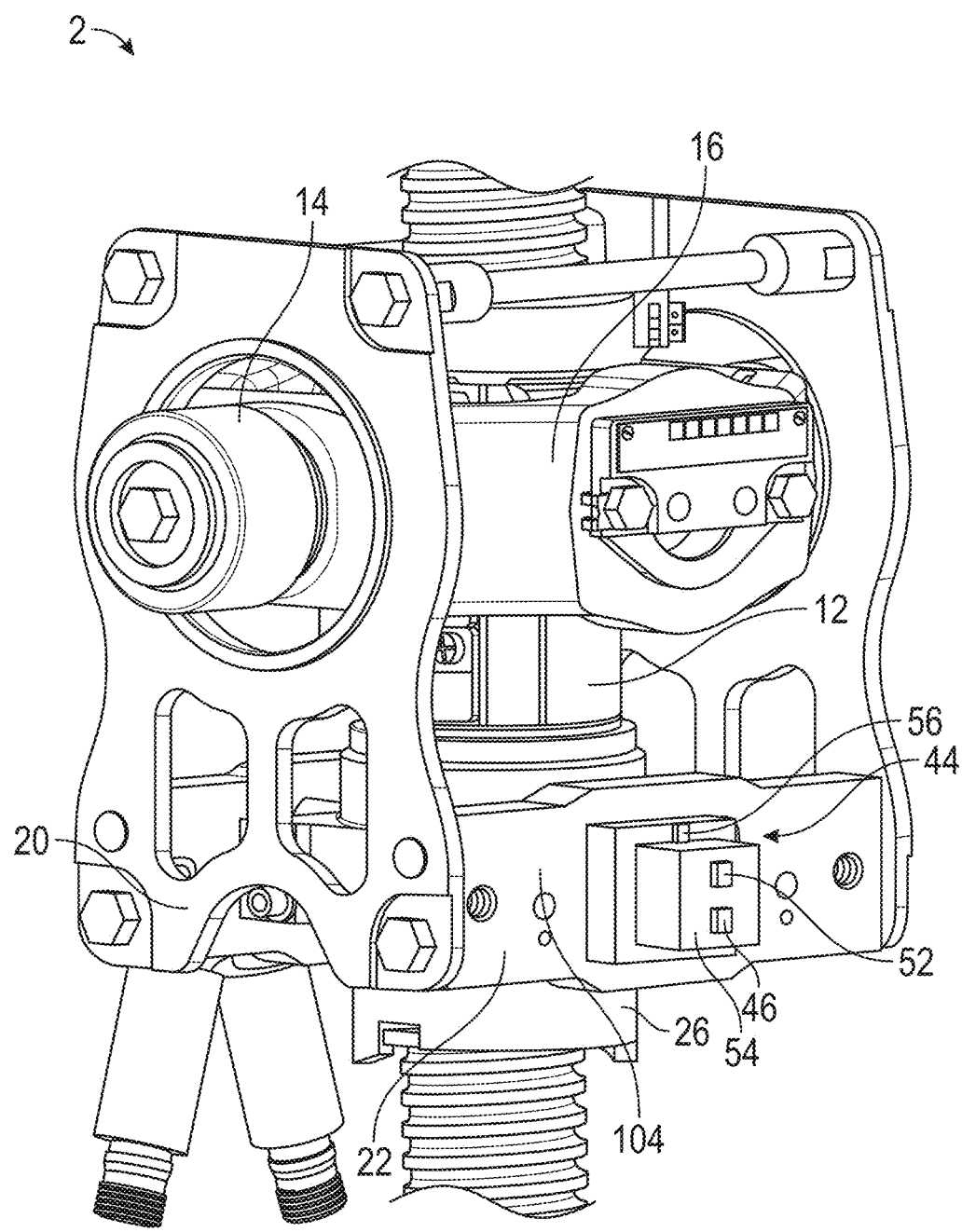
FIG. 7 shows the lower attachment of FIG. 2 including the locking assembly of FIGS. 5 and 6.

FIG. 7 shows the lower attachment 2 of FIG. 2 including the locking assembly 44 of FIGS. 5 and 6. The housing 54 of the locking assembly 44 is fastened to the transfer plate 22 via at least one fastener 56, so as to be fixed relative thereto. The fuse 52 and the locking pin 46 protrude from their respective apertures 74, 66 in the housing 54. By positioning the housing 54 on an external surface 104 of the transfer place 22, this provides easy access to the locking mechanism 44 by an operator, e.g. for installing the locking mechanism 44 and/or for checking the operation of the mechanism. However, a suitable locking assembly 44 could be provided on an inner side of the transfer plate 22 if desired.

Figure 8:
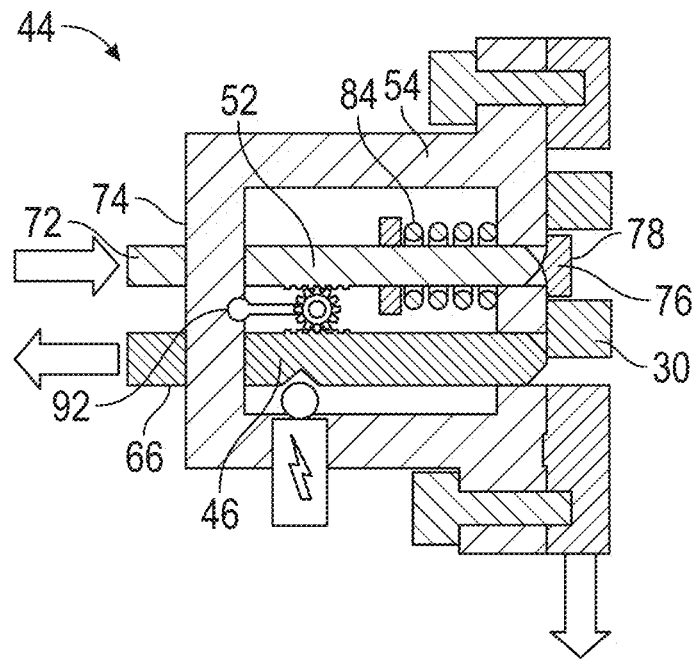
FIGS. 8 and 9 show configurations of the locking assembly of FIGS. 5 and 6 during a checking operation for checking whether the locking assembly is jammed.
Figure 9:
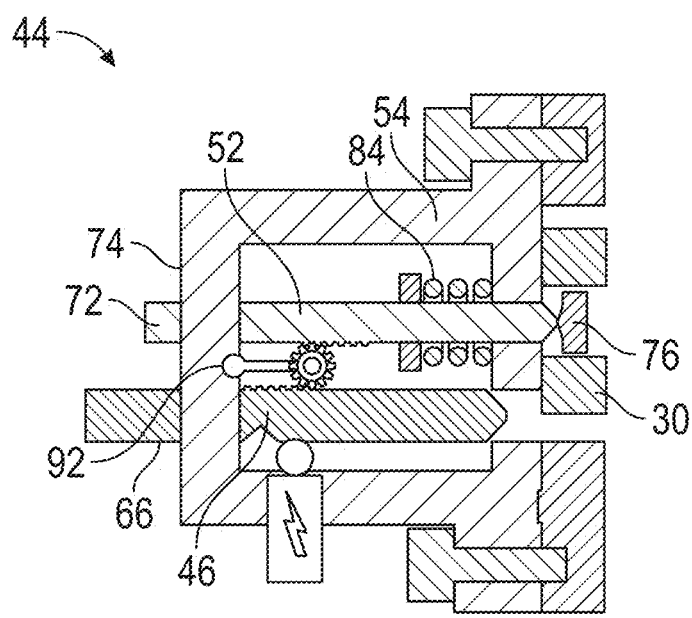

FIGS. 8 and 9 show how the locking mechanism 44 of FIGS. 5 and 6 can be checked to ensure the mechanism 44 is not jammed and/or to verify that the secondary nut assembly 18 is still in the first configuration.

FIG. 8 shows the portion of the lower attachment 2 described with reference to FIG. 5. To check the locking mechanism 44, an operator can apply a longitudinal force to the second end 72 of the fuse 52 which protrudes from the fourth aperture 74 of the housing 54.

If the mechanism 44 is not jammed, then this force will cause the fuse 52 to move to the right in the diagram, which compresses the spring 84 and moves the head portion 76 of the fuse 52 further into the opening 78 in the trunnion 30.

Due to the rack and pinion mechanism 92, this movement of the fuse 52 will cause the locking pin 46 to move in the opposite direction, away from the trunnion 30 (to the left in the diagram). The length of the fuse 52 protruding out of the housing 54 from the fourth aperture 74 will therefore decrease and the length of the locking pin 46 protruding out of the housing 54 from the second aperture 66 will increase. This is shown in FIG. 9.

Upon releasing the force, the spring 84 will bias the fuse 52 back to its normal position shown in FIG. 8 which will cause the locking pin 46 to return to its normal position as well.

The sensor 98 will detect this movement of the locking pin 46 to electronically verify that the locking pin 46 is moving as intended and hence that the mechanism 44 is not jammed.

The described lower attachments therefore offer at least the following potential benefits:

- The locking mechanism 44 locks the secondary nut 26 and transfer plate 22 together after their relative movement so as to reduce or cancel backlash therebetween.
- The secondary nut 26 and transfer plate 22 can be retained in position during normal conditions using a fuse 52 which resists relative movement therebetween up to a predetermined force threshold.
- The relative movement of the secondary nut 26 and the transfer plate 22 can be detected through a switch 98.
- The mechanism 44 is visually and electrically checkable.
- The movement between the fuse 52 and the locking pin 46 can be linked via a rack and pinion 92.
- The system can be made irreversible thanks to the biasing member(s) 84, therefore requiring manual input to reset the locking mechanism 44.

The methods and systems described herein and shown in the drawings provide a lower attachment for a trimmable horizontal stabiliser actuator that improves the cancellation of backlash. While the apparatus and methods herein have been shown and described with reference to exemplary embodiments, those skilled in the art will appreciate that changes and/or modifications may be made thereto without departing from the scope of the present invention as defined by the appended claims.

The invention claimed is:

1. A lower attachment for a trimmable horizontal stabiliser actuator (THSA) for connecting the THSA to a flight control surface, the lower attachment comprising:
    a nut assembly for providing a load path through the THSA to the flight control surface when the THSA is connected to the flight control surface, comprising:
        a nut for location on a screw shaft of the THSA,
        a failsafe plate for coupling to the flight control surface, and
        a transfer plate for transferring load between the failsafe plate and the nut;
        wherein the nut assembly has a first unloaded configuration in which there is no contact between the nut and the transfer plate, and a second loaded configuration in which there is contact between a first pair of opposed surfaces of the nut and the transfer plate, and a clearance between a second pair of opposed surfaces of the nut and the transfer plate; and
    a locking assembly operable to prevent relative movement of the nut and the transfer plate in response to the nut assembly transitioning to the second configuration;
    the lower attachment also including a fuse arranged to move in response to transition of the nut assembly from the first configuration to the second configuration, and thereby indicate that transition.

2. A lower attachment as claimed in claim 1, wherein the locking assembly comprises a locking pin which is urged to extend into the clearance when the nut assembly transitions from the first configuration to the second configuration.

3. A lower attachment as claimed in claim 2, wherein the locking assembly comprises a biasing member arranged to bias the locking pin into the clearance.

4. A lower attachment as claimed in claim 2, wherein a width of the locking pin is approximately the same as the height of the clearance.

5. A lower attachment as claimed in claim 1, wherein the nut comprises an opening, wherein when the nut assembly is in the first configuration a head portion of the fuse is located in the opening and a neck portion of the fuse is located at an entrance to the opening, and wherein the fuse is fixed relative to the transfer plate.

6. A lower attachment as claimed in claim 5, comprising a biasing member arranged to bias the fuse such that when the neck portion of the fuse breaks, a body of the fuse retracts away from the opening.

7. A lower attachment as claimed in claim 6, wherein a rack and pinion mechanism is arranged such that when the body of the fuse retracts the locking assembly is actuated.

8. A lower attachment as claimed in claim 1, further comprising a sensor arranged to detect actuation of the locking assembly.

9. A lower attachment as claimed in claim 1, wherein the nut assembly is a secondary nut assembly for providing a secondary load path when the secondary nut assembly is in the second configuration, and wherein the lower attachment comprises a primary nut assembly for providing a primary load path through the THSA to the flight control surface when the secondary nut assembly is in the first configuration.

10. A trimmable horizontal stabiliser actuator comprising: a lower attachment as claimed in claim 1.

11. A method of operating the lower attachment as claimed claim 1; the method comprising:
    actuating the locking mechanism in response to the nut assembly transitioning to the second configuration to thereby prevent relative movement of the nut and the transfer plate; and
    moving a body of the fuse in response to transition of the nut assembly from the first configuration to the second configuration.

12. A method as claimed in claim 11, wherein actuating the locking mechanism comprises inserting a locking pin into the clearance.

13. A method as claimed in claim 11, wherein movement of the body of the fuse optionally causes the locking pin to move into the clearance.

14. A method as claimed in claim 12, comprising checking whether or not the locking assembly is jammed by applying a force to the fuse and/or the locking pin.

* * * * *